United States Patent [19]

Jo

[11] Patent Number: 5,495,354
[45] Date of Patent: Feb. 27, 1996

[54] METHOD OF PRODUCING A COLOR FILTER FOR A LIQUID CRYSTAL DISPLAY BY DEPOSITING METAL BLACK MATRICES ON A TRANSPARENT INSULATING SUBSTRATE AND FORMING COLOR ELEMENTS THEREBETWEEN

[75] Inventor: Gyoo C. Jo, Kyungsangbuk-do, Rep. of Korea

[73] Assignee: Gold Star Co., Ltd, Seoul, Rep. of Korea

[21] Appl. No.: 151,522

[22] Filed: Nov. 12, 1993

[30] Foreign Application Priority Data

Nov. 12, 1992 [KR]  Rep. of Korea ............... 1992-21236
Feb. 18, 1993 [KR]  Rep. of Korea ............... 1993-2238

[51] Int. Cl.$^6$ ................................................ G02F 1/1335
[52] U.S. Cl. ................................................ 359/67; 359/68
[58] Field of Search ................................. 359/67, 68, 87

[56] References Cited

U.S. PATENT DOCUMENTS 4,873,175  10/1989  Suzuki et al. .................. 430/311
5,236,793   8/1993  Nishiwaki et al. .............. 359/68

FOREIGN PATENT DOCUMENTS 0367466  5/1990  European Pat. Off. .
4086703  3/1992  Japan .
2240204  7/1991  United Kingdom .

*Primary Examiner*—William L. Sikes
*Assistant Examiner*—James A. Dudek
*Attorney, Agent, or Firm*—Helfgott & Karas

[57] ABSTRACT

A method of producing a color filter for a liquid crystal display which can improve the evenness of a color filter surface layer by eliminating the difference in height between black matrices and color elements. The black matrices are formed on a transparent insulating layer and the color elements of red, green and blue are formed between the black matrices. On the black matrices, additional black matrices are formed with the same height as the color elements by electroplating, and a protective layer and a transparent conductive layer are formed thereon. Alternatively, the transparent conductive layer and the color elements are formed on the transparent insulating substrate in turn, the black matrices are formed between the respective color elements up to the same height as the color elements, and then the protective layer is formed thereon.

4 Claims, 5 Drawing Sheets

METHOD OF PRODUCING A COLOR FILTER FOR A LIQUID CRYSTAL DISPLAY BY DEPOSITING METAL BLACK MATRICES ON A TRANSPARENT INSULATING SUBSTRATE AND FORMING COLOR ELEMENTS THEREBETWEEN

BACKGROUND OF THE INVENTION

1. Field of the Invention

The present invention relates to a liquid crystal display (LCD), and more particularly to a method of producing a color filter for a liquid crystal display which can improve the evenness of the color filter surface layer by eliminating the difference in height between black matrices and color patterns using electroplating.

2. Description of the Prior Art

FIG. 1 shows a construction of a conventional color filter for a liquid crystal display. The color filter is composed of a transparent insulating substrate 1, a plurality of black matrices 2 formed on transparent substrate 1, color elements of red, green and blue, selectively formed between black matrices 2, a protective layer 4 formed on the color elements and black matrices 2, and a transparent conductive layer 5, formed on the protective layer 4.

FIGS. 2A to 2C are views explaining a method of producing a conventional color filter having the above construction. First, as shown in FIG. 2A, black matrix 2 is formed on substrate 1 by photolithography process using a photo-mask having a predetermined pattern after sputtering or evaporating metals such as chrome aluminum, etc. on substrate 1.

Black matrix 2, as is well known, has functions of increasing the color contrast of the LCD and preventing an increase of an off-current of a thin film transistor by external light, Which is used as a switching device for driving a liquid crystal display. Also, black matrix 2 can be formed by the same photolithography process as above after a photo sensitive black polymer is applied on substrate 1. Next, color elements 3 of red, green and blue are formed between black matrices 2 as shown in FIG. 2B. In forming color elements 3, the following methods are commonly used:

1) On a substrate on which black matrices 2 are formed, a photosensitive and dyeable polymer such as gelatin, casein, etc. is applied and then is exposed to light and developed to be patterned. This polymer-patterned substrate is dyed with a predetermined color in a dyeing reservoir and then is resist-processed with tannin acid, etc. By repeating the above process three times according to the red, green and blue colors, the forming of color elements 3 is completed.

2) As shown in FIGS. 2A to 2D, on a substrate 1 on which black matrices 2 are formed, a color resist of dispersed pigment is applied and then is exposed to light with a predesigned photo-mask to be patterned. By repeating the above process three times according to the red, green and blue colors, the forming of color elements 3 is completed.

3) Color elements 3 of red, green and blue are formed by printing in ink of desired colors by rollers on substrate 1 on which black matrices 2 are formed. After color elements are formed as above, as shown in FIG. 2C, protective layer 4 is evaporated thereon with a transparent material such as an acryl resin, an epoxy resin, a polyvinyl alcohol, a polyimide, a polyurethane, etc., and then transparent conductive layer 5 of indium tin oxide is evaporated by sputtering or vacuum evaporating, so that a color filter for a liquid crystal display is completed.

FIG. 3 shows a construction of another type of a conventional color filter for a liquid crystal, display. This color filter is composed of transparent insulating substrate 1, a transparent conductive layer 15 formed thereon, color elements 3 and black matrices 2 formed on transparent conductive layer 15 and a protective layer 4 formed on color elements 3 and black matrices 2.

The method of producing a conventional color filter having the same construction as above is as follows. As shown in FIG. 4A, transparent conductive layer 15 of indium tin oxide is evaporated on transparent insulating substrate 1 by sputtering or vacuum evaporating, and then a color resist is applied thereon and exposed to light through a predesigned photo mask and developed, so that red color elements 3 are formed, and then this is dipped into a developing liquid to develop the remaining color resist. By the same method as above, green and blue color elements 3 are also formed, and the resultant color filter from this process is shown in FIG. 4B. Next, black matrices 2 are formed by self-align or electric deposition of a photosensitive black polymer on color elements 3, and a protective layer is formed thereon to complete a color filter as shown in FIG. 4C.

However, according to the above-described conventional method of producing a color filter for a liquid crystal display, the evenness of the color filter layer is low due to the difference in height between black matrices and color elements. Further, since the black matrices are formed by the method of self-alignment or electric depositing, there is a defect in that the processing is complicated.

SUMMARY OF THE INVENTION

It is an object of the present invention to provide a method of producing a color filter for a liquid crystal display which can improve the evenness of the color filter surface layer by eliminating the difference in height between black matrices and color elements.

It is another object of the present invention to provide a method of producing a color filter for a liquid crystal display which can simplify the processing steps.

It is still another object of the present invention to provide a method of producing a color filter for a liquid crystal display which can reduce the resistance of a transparent conductive layer to be formed as an electrode.

To achieve the above objects, the present invention provides a method of producing a color filter for a liquid crystal display comprising the steps of:

depositing black matrices on a transparent insulating substrate at predetermined intervals;

forming color elements of red, green and blue at predetermined positions between the black matrices;

forming additional black matrices on the deposited black matrices by electroplating;

forming a protective layer on the color elements and additional black matrices; and forming a transparent conductive layer on the protective layer.

The present invention also provides a method of producing a color filter for a liquid crystal display comprising the steps of:

forming a transparent conductive layer on a transparent insulating substrate;

forming color elements of red, green and blue on the transparent conductive layer;

electroplating black matrices between the color elements so that the height of the black matrices substantially equals to that of the color elements; and forming a protective layer on the color elements and black matrices.

BRIEF DESCRIPTION OF THE DRAWINGS

The above objects and other advantages of the present invention will become more apparent by describing the preferred embodiments thereof with reference to the accompanying drawings, in which.

DETAILED DESCRIPTION OF THE PREFERRED EMBODIMENTS

FIGS. 5A to 5F show a producing process of a color filter according to one embodiment of the present invention.

Figure 1:
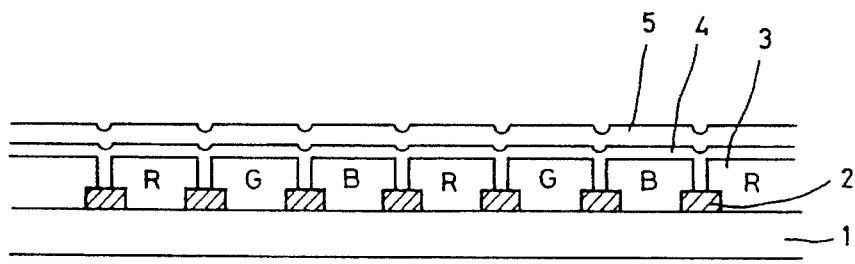
FIG. 1 is a sectional view of a conventional color filter for a liquid crystal display.
Figure 2A:
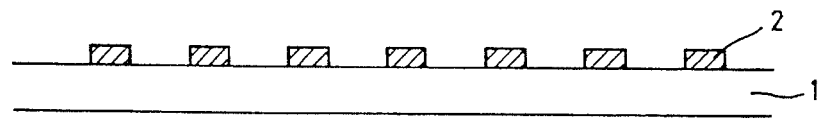
FIGS. 2A–2C are views explaining the producing process of the color filter shown in FIG. 1.
Figure 2B:
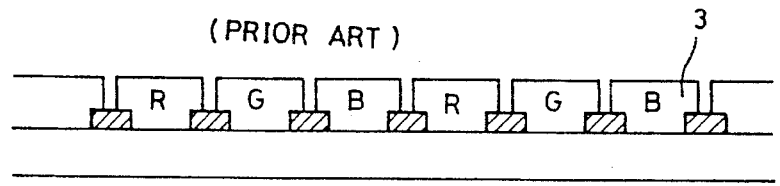
Figure 2C:
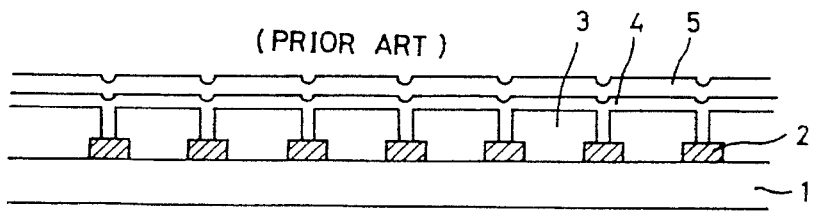
Figure 3:
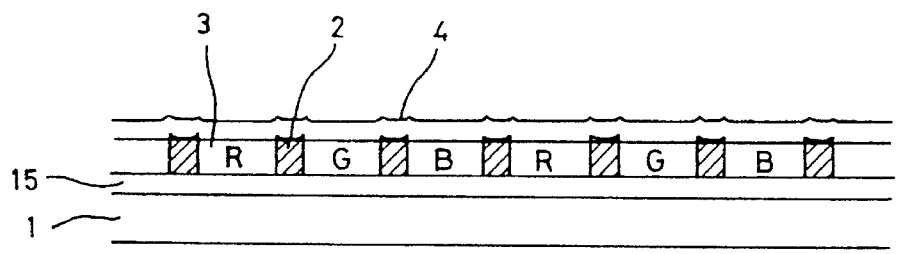
FIG. 3 is a sectional view of another conventional color filter for a liquid crystal display.
Figure 4A:
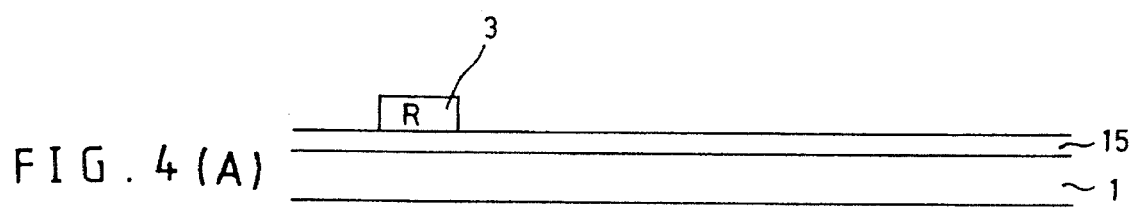
FIGS. 4A–4C are views explaining the producing process of the color filter shown in FIG. 3.
Figure 4B:
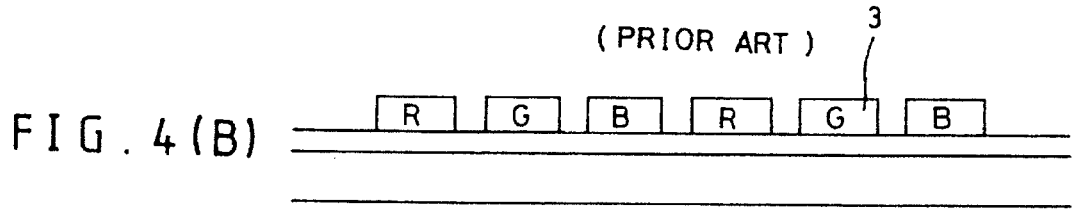
Figure 4C:
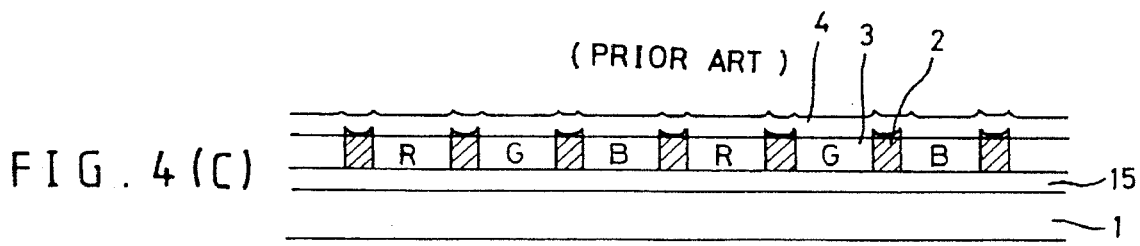
Figure 5A:
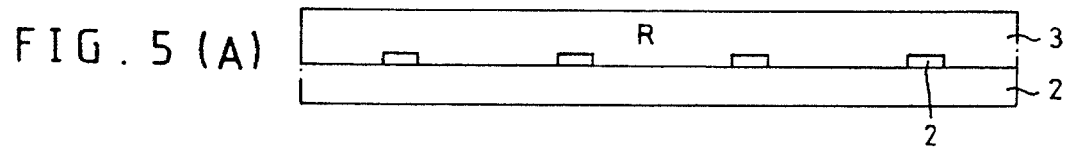
FIGS. 5A–5F are views explaining the producing process of a color filter according to one embodiment of the present invention.
Figure 5B:
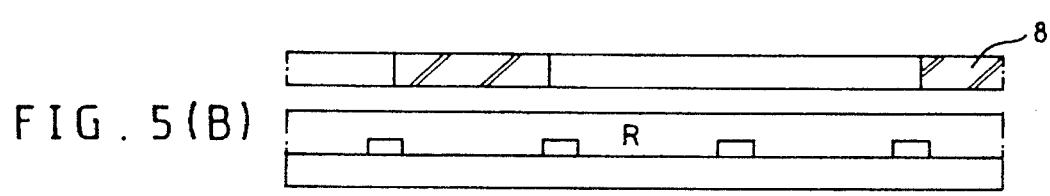
Figure 5C:
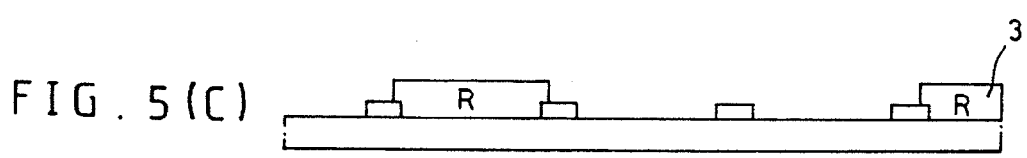

During the first step, on a transparent substrate 1, black matrices 2 are formed and a red color element 3 of photosensitive organic matter is coated as shown in FIG. 5A. On the second step, color element 3 is exposed to ultraviolet rays through a photomask 8 having predetermined patterns as shown in FIG. 5B. In the third step, predetermined patterns are formed in red color element 3 with developing liquid. FIG. 5C shows the state that this step is completed. In the fourth and fifth steps, green and blue color elements are formed by the same method as mentioned above, as shown in FIG. 5D.

In forming color elements 3, the second method of the afore-mentioned three methods is utilized in the above steps, while one of the remaining methods can be utilized.

Figure 5D:
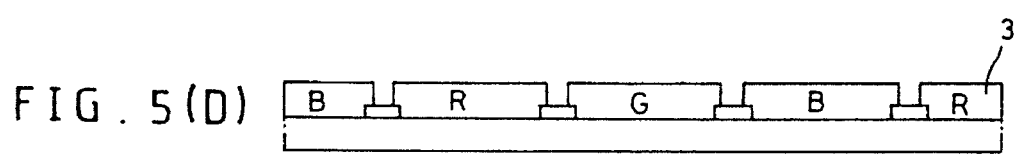
Figure 5E:
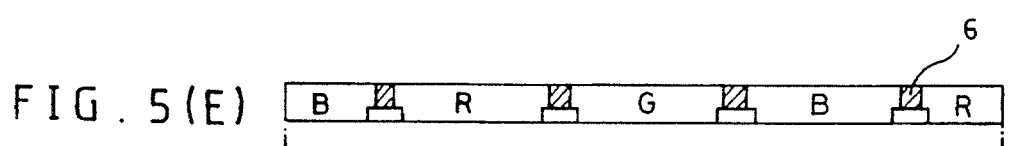
Figure 5F:
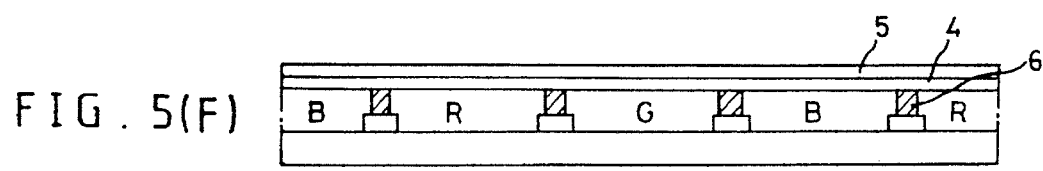

Referring to FIG. 5D, it is noted that the height of color elements 3 formed by the above process is greater than that of black matrices 2. To eliminate this difference in height, additional black matrices 6 are formed on each black matrix 2 through electroplating so that the height of color elements becomes equal to that of black matrices at the sixth step as shown in FIG. 5E.

In the seventh step, protective layer 4 of transparent material such as acryl resin is coated, and thereon a transparent conductive layer which will function as an electrode is deposited by sputtering or vacuum evaporating, thereby resulting in completion of a color filter.

Figure 8:
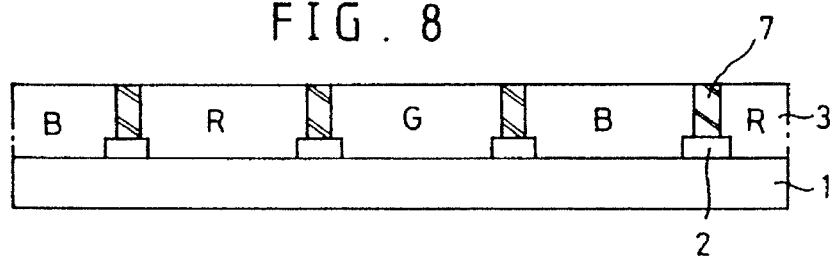
Figure 9:
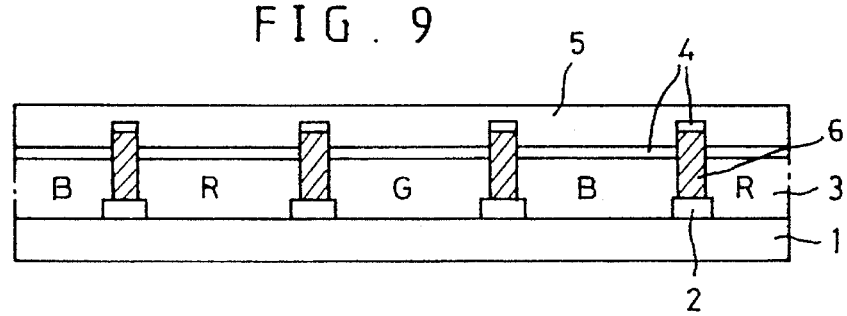
Figure 10:
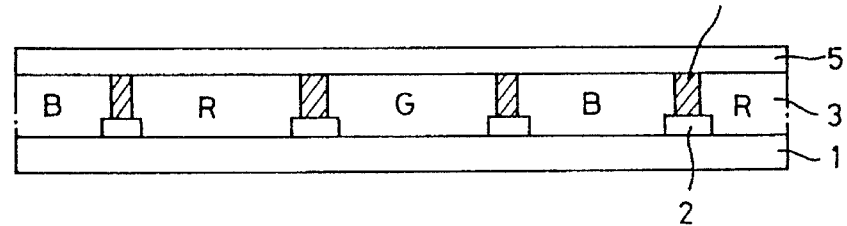

Additional black matrices 6 may be formed as examples, as shown in FIGS. 7 to 10. According to the example shown in FIG. 7, additional black matrices 6 are formed on black matrices 2 by electroplating, and then organic matter 7 is deposited with the same height as color elements 3. As shown in FIG. 8, organic matter 7 may be deposited directly on black matrices 2. According to the example shown in FIG. 9, additional black matrices 6 are electroplated to be higher than color elements 3 so that the ends of additional black matrices 6 can be in contact with transparent conductive layer 5, which can make the resistance of transparent conductive layer 5 decrease. According to the example shown in FIG. 10, additional black matrices 6 are electroplated with the same height as the color elements, and transparent conductive layer 5 is formed directly thereon without a protective layer.

Figure 6A:
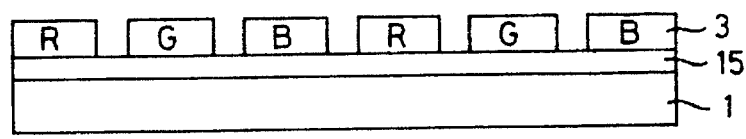
FIGS. 6A–6C are views explaining the producing process of a color filter according to another embodiment of the present invention.
Figure 6B:
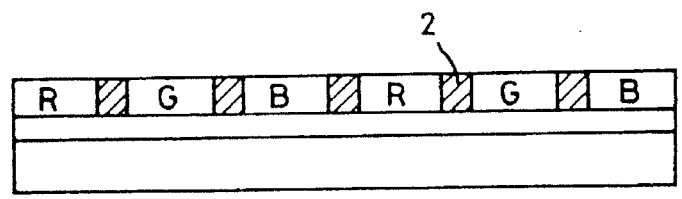
Figure 6C:
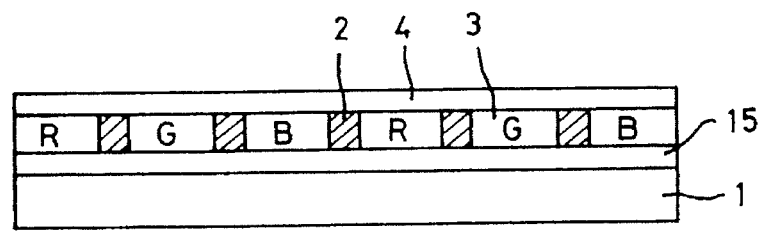
Figure 7:
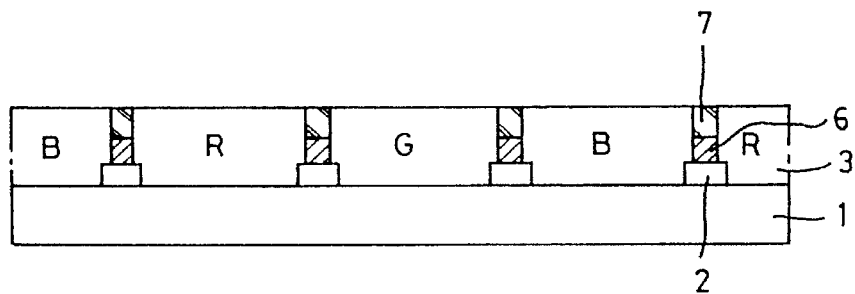
FIGS. 7–10 show examples of forming black matrices in the producing process of a color filter according to one embodiment of the present invention.

FIGS. 6A to 6C show a process of producing a color filter according to another embodiment of the present invention.

First, transparent conductive layer 15 of indium tin oxide is deposited on transparent insulating substrate 1 by sputtering or vacuum evaporating, and color elements 3 are formed by one of the afore-mentioned methods. Next, black matrices 2 are formed by electroplating as shown in FIG. 6B, and then protective layer 4 is formed thereon, and thereby a color filter for a liquid crystal display is completed as shown in FIG. 6C.

A method of electroplating black matrices 2 according to the invention will be described hereinafter, referring to FIG. 11.

Though a metal such as copper, nickel, zinc, chrome, cadmium, lead, tin, gold, silver or alloy thereof can be used in electroplating, an example which adopts chrome as plating metal will now be explained.

Figure 11:
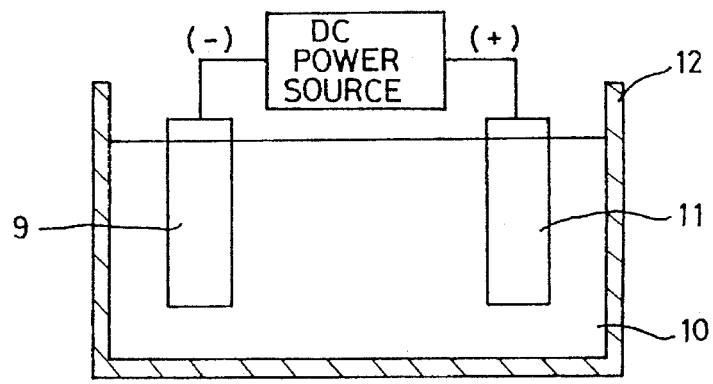
FIG. 11 shows a constitution of an electroplating apparatus to form black matrices in a producing process of a color filter according to the present invention.

As shown in FIG. 11, chromic anhydride plating liquid 10 is filled in electrolytic cell 12, and lead alloy or lead oxide is used for anode electrode 11, and a color filter substrate 9 on which color elements 3 are formed is fixed as a cathode electrode.

When the direct current is applied to the electrodes, oxygen gas is generated from the anode electrode and metal of the anode electrode is oxidized with chrome(III) oxidized to chrome(VI), while in the cathode electrode, hydrogen gas is generated and chrome (VI) in the plating solution is reduced to the metal chrome to be plated on the color filter substrate 9.

In case of electroplating additional black matrices 6 after depositing black matrices 2 as shown in FIG. 5 or FIGS. 7 to 10 as well as in case of electroplating black matrices 2 directly on transparent conductive layer 15 as shown in FIG. 6, preparatory work such as grinding is not required for electroplating because black matrices 2 are deposited by sputtering on transparent substrate 1 and thus the surface thereof can be kept clean. Accordingly, the surface of the electroplated metal has good evenness and good luster. In electroplating, the plating solution and anode electrode metal are predetermined according to the metal to be plated, and catalysts can be added to control the plating speed.

From the foregoing, according to the method of the present to invention, the difference in height between color elements and black matrices can be eliminated by electroplating and the evenness of a color filter surface layer is improved. Further, in case of forming black matrices only by electroplating, the producing process can be simplified because the step of forming black matrices by self-alignment or electric depositing may be omitted. Also, and in the case of forming black matrices to be contact with the transparent conductive layer, the resistance of the transparent conductive layer is decreased.

What is claimed is:

1. A method of producing a color filter for a liquid crystal display comprising the steps of:

depositing black matrices on a transparent insulating substrate at predetermined intervals;

forming color elements of red, green and blue at predetermined positions between said black matrices;

forming additional black matrices on said deposited black matrices be electroplating;

forming a protective layer on said color elements and said additional black matrices; and forming a transparent conductive layer on said protective layer, wherein said step of forming additional black matrices comprises the substeps of:

forming said additional black matrices with a height lower than that of said color elements by electroplating; and forming an organic layer up to the same height as that of said color elements on said additional black matrices.

2. A method of producing a color filter for a liquid crystal display comprising the steps of:

depositing black matrices on a transparent insulating substrate at predetermined intervals;

forming color elements of red, green and blue at predetermined positions between said black matrices;

forming additional black matrices on said deposited black matrices by electroplating;

forming a protective layer on said color elements and said additional black matrices; and forming a transparent conductive layer on said protective layer, wherein said additional black matrices are formed higher than said color elements, so that upper parts of said additional black matrices are in contact with said transparent conductive layer.

3. A method of producing a color filter for a liquid crystal display having a transparent insulating substrate, black matrices, color elements of red, green and blue, a protective layer, and a transparent conductive layer, the method comprising the step of forming additional black matrices on the black matrices and in contact therewith by electroplating, wherein said additional black matrices are formed higher than the color elements, so that upper parts of the additional black matrices are in contact with the transparent conductive layer.

4. A method of producing a color filter for a liquid crystal display having a transparent insulating substrate, black matrices, color elements of red, green and blue, a protective layer, and a transparent conductive layer, the method comprising the steps of:

forming additional black matrices on the black matrices and in contact therewith by electroplating; and forming an organic layer on the additional black matrices, wherein said organic layer is formed with the same height as the color elements.

* * * * *